UNITED STATES PATENT OFFICE.

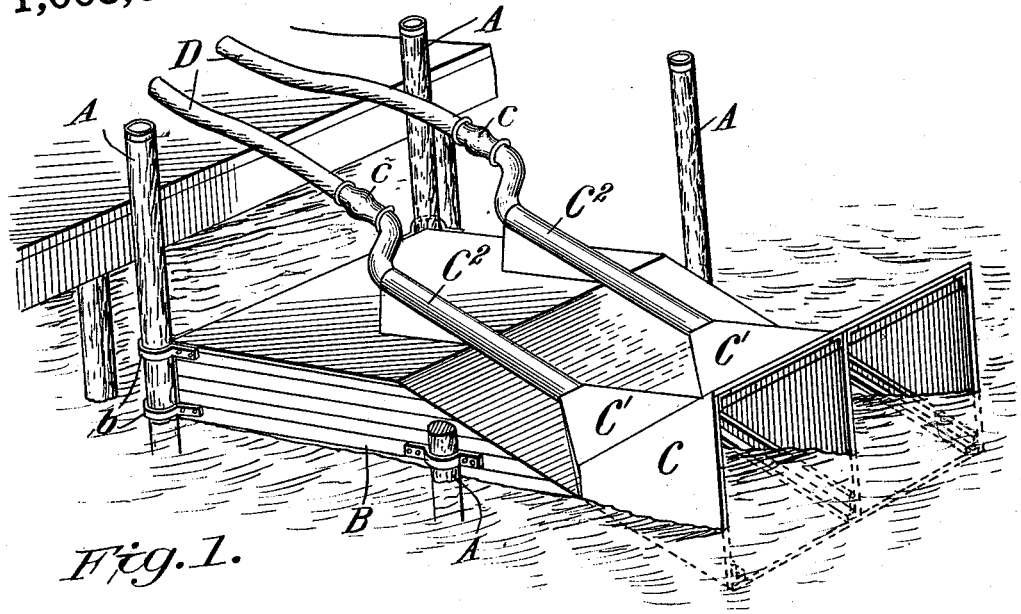
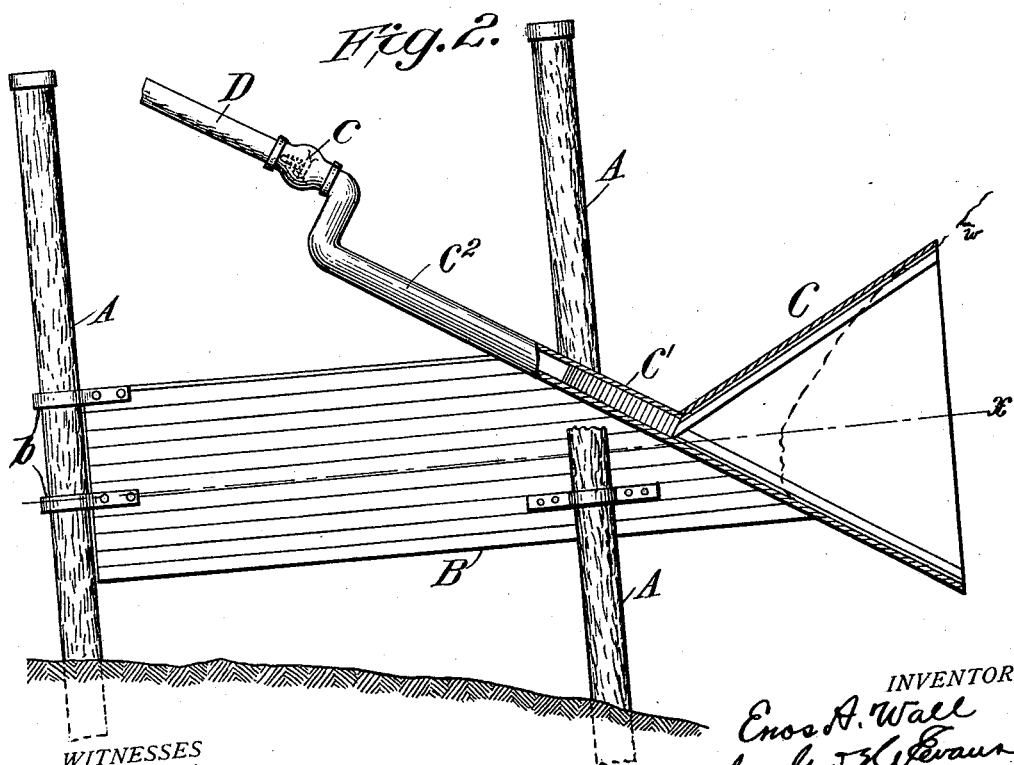

ENOS A. WALL, OF SALT LAKE CITY, UTAH.

WAVE-ACTUATED AIR-COMPRESSOR.

1,008,683.  Specification of Letters Patent.  Patented Nov. 14, 1911.

Application filed April 10, 1911. Serial No. 620,249.

*To all whom it may concern:*

Be it known that I, ENOS A. WALL, a citizen of the United States, residing at Salt Lake City, in the county of Salt Lake and State of Utah, have invented certain new and useful Improvements in Wave-Actuated Air-Compressors, of which the following is a specification.

My invention relates to the compression of air by wave power.

The object of the invention is to provide an apparatus in which air may be compressed by the direct action of waves and stored for use in ventilation or for use in operating machinery, such as dynamos, motors, and the like. This object I accomplish by the construction shown in the accompanying drawing, in which—

Figure 1 is a perspective of my improved apparatus. Fig. 2 is a sectional side elevation thereof.

A, designates four guide posts firmly planted in the beach at the point best suited for the purpose. B, designates a float guided vertically by said posts during the rise and fall of the tide. The float has straps $b$, freely movable on the posts and the float may be water ballasted if desired in the usual manner. The outer end of the float is inclined as shown and to this inclined portion is secured a plurality of connected rectangular funnels C, with their wide, open ends facing the incoming waves. The larger open ends of the funnels are of sufficient breadth to span across and receive the entire impact of the waves, one of which is indicated by the broken line $w$, in Fig. 2. The contracted outlets $C'$, from the funnels are inclined substantially parallel with the inclination of the beach, in order not to deflect materially the direction of the greatest thrust-force of the waves at the point of contact with the waves. The entrance to the contracted throats or outlets $C'$ are slightly above the surface of the normal water line $x$, so that as the waves recede the water will run out of the throats $C'$ which will become filled with air. From the upper ends of the throats $C'$, extend offtake pipes $C^2$, each having an upward opening check valve $c$, and a flexible delivery pipe D. These pipes D, lead to a tank (not shown) on the shore.

As the waves impact with full force into the wide outer ends of the funnels the air will be imprisoned in the throats $C'$ and the water in rushing therein will force the compressed air past the check valves into delivery pipes D.

The float will be ballasted so as to keep the funnels in the position shown relative to the line $x$.

The air stored may be used in ventilating buildings or in operating machinery.

What I claim is:—

1. An air compressing mechanism comprising, a float mounted to rise and fall with the tide, a plurality of connected funnels on the outer end of the float with their open, wide ends facing the incoming waves, contracted outlets at the small rear ends of the funnels, located above the water level so as to be free from water and fill with air on the recession of the waves, offtakes from the said contracted outlets and check valves in said offtakes, the said funnels and contracted outlets being entirely open and unobstructed.

2. An air compressing mechanism comprising, a horizontally extending float mounted to rise and fall with the tide, guides for the float, a plurality of connected funnels mounted on the inclined outer end of the float with their open, wide ends facing the incoming waves and having upwardly inclined contracted outlets lying above the water level, so as to be free from water and fill with air on the recession of the waves from said contracted outlets, offtakes leading from the contracted outlets and provided with check valves, and flexible pipes leading from said offtakes the said funnels and contracted outlets being entirely open and unobstructed.

In testimony whereof I affix my signature in presence of two witnesses.

ENOS A. WALL.

Witnesses:
HENRY A. RIPPE,
LLEWELLYN D. LEE.

Copies of this patent may be obtained for five cents each, by addressing the "Commissioner of Patents, Washington, D. C."